Nov. 11, 1952  J. M. KNEECE ET AL  2,617,227
FISHING LURE WITH A COMBINED WEED GUARD AND SKIRT CLAMP
Filed April 13, 1948  2 SHEETS—SHEET 1

Inventors
Jack M. Kneece &
Ira B. Harkey, Jr.

By Cushman, Darby & Cushman
Attorneys.

Nov. 11, 1952   J. M. KNEECE ET AL   2,617,227
FISHING LURE WITH A COMBINED WEED GUARD AND SKIRT CLAMP
Filed April 13, 1948   2 SHEETS—SHEET 2

Inventors
Jack M. Kneece &
Ira B. Harkey, Jr.
By Cushman, Darby & Cushman
Attorneys.

Patented Nov. 11, 1952

2,617,227

UNITED STATES PATENT OFFICE 2,617,227

FISHING LURE WITH A COMBINED WEED GUARD AND SKIRT CLAMP

Jack M. Kneece and Ira B. Harkey, Jr.,
New Orleans, La.

Application April 13, 1948, Serial No. 20,718

3 Claims. (Cl. 43—42.4)

This invention has to do with fishing lures. More particularly it is directed to a novel and useful form of weed guard and skirt or rind holder so designed as to effectually guard the hook from weed entanglement and, further, to detachably clamp the usual skirt or rind in position. The combined weed guard and skirt clamp is so formed that it may be readily removed for replacement or change of the skirt or rind, its design being such that its replacement or removal from the lure can be readily accomplished without the use of any particular tools for or skill in handling.

Briefly, these objects are accomplished by providing a combined weed guard and skirt clamp preferably formed of a single piece of spring wire adapted to be mounted in a recess in the body of the lure, means being provided for detachably engaging it in such recess so that the weed guard members are positioned in proper relation to the hook and the skirt clamp will engage the inner end of the skirt with a spring engagement so as to hold it in position, the construction permitting ready displacement of the weed guard, skirt clamp, and the skirts held thereby. Several forms of the invention are shown in the accompanying drawings and in said drawings:

Figure 1:
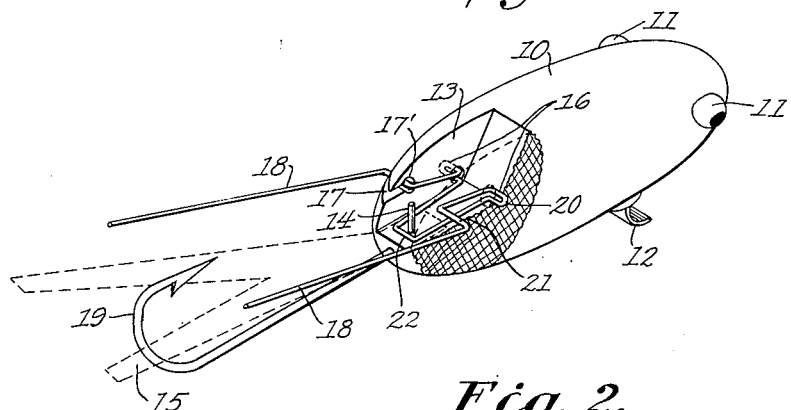
Figure 1 is a perspective view of a lure with the weed guard and skirt clamp in place, a portion of the lure being broken away for clearness of illustration.
Figure 2:
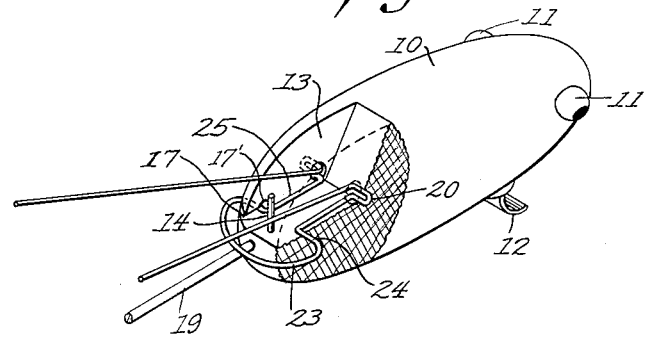
Figure 2 is a similar view of a lure showing a slightly different form of weed guard.

Referring to the drawings by numerals, the same numerals designating the same parts in the several views, and referring first to Figures 1 and 2, the body of the lure, designated by the numeral 10, may be of any usual or conventional design and provided with the eyes 11 and a movable part such as, for example, paddle wheel 12.

One end of the lure 10 is provided with an open recess 13 having bottom, side, and an end wall. The bottom wall is provided with a straight skirt-receiving pin 14 or equivalent device permitting easy detachment of a skirt by which the inner end of the skirt 15 may be engaged. The side walls of the recess 13, as shown in Figures 1 and 2, are provided with apertures or sockets 16, and the side walls of recess 13 at their ends have the slots 17. These sockets 16 and slots 17 provide mounting means on the lure 10 for the weed guard and skirt clamp.

The weed guard and skirt clamp, as shown in Figure 1, is preferably made up of a single piece of spring wire having, as here shown, a plurality of projecting members 18 which straddle the hook 19 and effectually direct weeds away from entanglement with the hook. The end of the weed guard and skirt clamp which is engaged in the recess 13 is provided with projections 20, here shown as bends in the wire, to engage the sockets 16 in the side walls of the recess 13. The slots 17 in the ends of the side walls are engaged by offset portions or shoulders 21 formed in the weed guard in order to position that guard so that the arms 18 will be in proper relation to the hook 19. At their inner ends slots 17 have enlarged portions 17', here shown as round, to hold the shoulders 21 in position. The skirts 15, which are removably mounted on the pin 14, are clamped in position by means of a portion 22, preferably formed integral with the weed guard, this clamp 22 gripping the skirt or rind with a spring grip so as to hold the skirt firmly in position on its pin 14. The weed guard and skirt clamp can be readily removed by disengaging the offset portions 21 from the slot 17 and, by further compressing the arms of the weed guard, disengaging the projections 20 from their sockets or seats 16.

This construction gives a combined weed guard and skirt clamp which can be detachably and securely mounted on the lure and which provides a satisfactory weed guard and clamping means to hold the detachably mounted skirt or rind in place.

In the form of the invention shown in Figure 2, a slightly different construction of weed guard and skirt clamp is shown. In this form the skirt clamp is extended beyond the mouth of the recess in the form of a loop 23 which has the slot-engaging shoulders 24, instead of forming such shoulders in the limbs of the weed guard, as shown in Fig. 1, this loop 23 giving greater elasticity to the skirt clamp, the skirt being held by the limbs 25 of the clamp.

Figure 3:
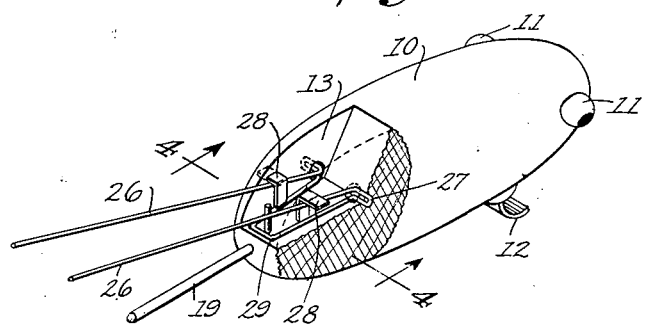
Figure 3 is a similar view showing a further modified form of weed guard mounting.
Figure 4:
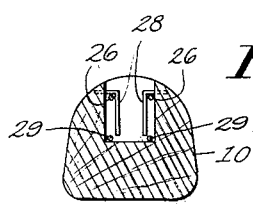
Figure 4 is a sectional view on substantially the line 4—4 of Figure 3 looking in the direction of the arrows.

In the form of the invention shown in Figures 3 and 4, the weed guard and skirt clamp differ slightly from the form shown in Figures 1 and 2 in that the weed guard members 26 extend in a straight line from the socket-engaging projections 27 and are not provided with slot-engaging shoulders. In lieu of the slots shown in Figures 1 and 2, there are provided substantially L-shaped clips 28 secured to the side walls of the recess 13 and the arms 26 of the weed guard are held in place by the clips 28, as shown in Figures 3 and 4. The skirt clamp 29 is the same as shown in Figure 1.

Figure 5:
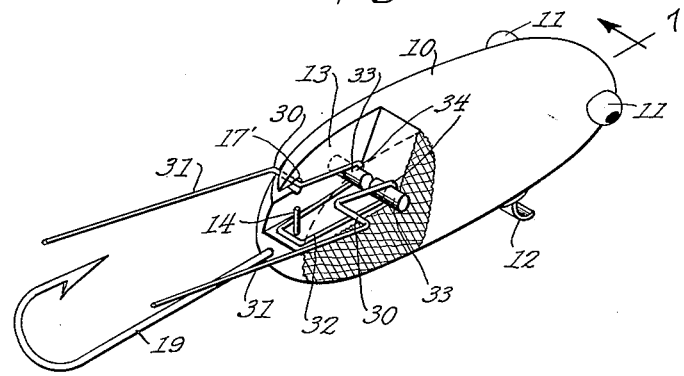
Figure 5 is a similar view showing a slightly different form of weed guard mounting.

In the form of the invention illustrated in Figure 5 a different mounting for the weed guard and skirt clamp is shown. The body 10 of the lure is slotted as in the form shown in Figures 1 and 2 to engage the offset portions or shoulders 30 and the weed guard 31 of the skirt clamp 32 is of the same general construction as heretofore described. Instead of providing this skirt clamp with projections to engage recesses in the side walls of the recess 13, pins 33 are provided which project inwardly from the side walls of the recess 13, these pins 33 being engaged by loops 34 formed in the weed guard. It will be seen that by compressing the loops 34 they may be disengaged from their pins 33, the offsets or shoulders 30 removed from the slots in the body 10, and the weed guard and skirt clamp readily removed.

Figure 6:
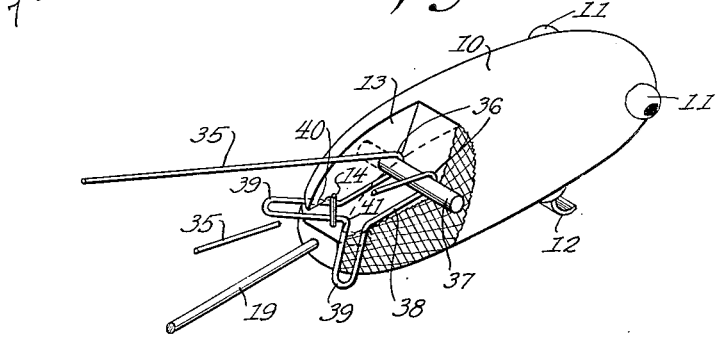
Figure 6 is a similar view showing still another form of weed guard and mounting.
Figure 7:
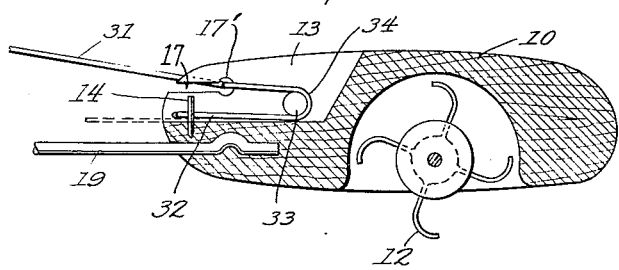
Figure 7 is a longitudinal sectional view of the lure on the line 7—7 of Figure 5, looking in the direction of the arrows.

In the form of the invention shown in Figure 6, the weed guard members 35 are disposed in the same relation to the hook as in the constructions heretofore described, but these weed guard members will be provided with loops 36 which may be hooked around a pin 37 projecting across the recess 13. The skirt clamp 38 is provided with projecting loops 39 which engage slots 40 in the body of the lure, which loops 39 project outwardly so that they may be readily grasped and unseated from the slots 40 to permit the weed guard and skirt clamp to be removed from the pin 37. Removal of the guard and skirt clamp in the modification of Figure 6 is effected by unseating the loops 39 of slots 40 and then reversing or tilting the guard and clamp forwardly whereby the guard members may be removed from under the pin 37. The inner bend 41 of the loops 39 may be engaged over or disposed adjacent the pin 14 on which the skirt or rind is mounted and serves to clamp it firmly in place on the pin.

The several forms of combined weed guard and skirt clamp disclosed provide convenient and satisfactory means, readily detachable from the body of the lure, for guarding the hook from weed entanglement and at the same time detachably clamps the skirts or rinds in place so as to permit easy placement or substitution of different skirts when necessary.

While specific constructions of the invention are shown, it will be understood that these are illustrative only and the invention is not limited to the particular forms disclosed, and all changes involving only mechanical skill and comprehended by the appended claims are to be regarded as within the range of the invention.

We claim:

1. A fishing lure comprising a body recessed at one of its ends and having slots in said end on each side of the recess, a hook extending from said body, a plurality of weed guards detachably mounted in said recess and straddling said hook, said weed guards having shoulders to engage the slots in the end of said body, and a resilient skirt clamp formed integral with said weed guards.

2. A fishing lure comprising a body recessed at one of its ends and having slots in said end on each side of the recess, a hook extending from said body, a plurality of weed guards detachably mounted in said recess and straddling said hook, said weed guards having shoulders to engage the slots in the end of said body, and a resilient skirt clamp formed integral with said weed guards and adapted to bear against the bottom of said recess, and a skirt holding pin projecting from the bottom of said recess adjacent said skirt clamp.

3. A fishing lure comprising a recessed body providing side walls having sockets in said side walls, a hook extending from said body, a plurality of weed guards straddling said hook and a resilient skirt clamp formed integral with said weed guards and having projections for engaging the sockets in said side walls.

JACK M. KNEECE.
IRA B. HARKEY, Jr.

REFERENCES CITED

The following references are of record in the file of this patent:

UNITED STATES PATENTS

| Number | Name | Date |
|---|---|---|
| 1,629,510 | Klipec | May 24, 1927 |
| 1,778,214 | Fisher | Oct. 14, 1930 |
| 2,256,346 | Mathie | Sept. 16, 1941 |
| 2,319,026 | Adam | May 11, 1943 |
| 2,492,064 | Rauh | Dec. 20, 1949 |